United States Patent [19]

Andersson

[11] 4,130,270
[45] Dec. 19, 1978

[54] WEDGE ARRANGEMENT

[75] Inventor: Einar W. Andersson, Gavle, Sweden

[73] Assignee: Sandvik Aktiebolag, Sandviken, Sweden

[21] Appl. No.: 843,310

[22] Filed: Oct. 18, 1977

[51] Int. Cl.² .................................................. B66F 15/00
[52] U.S. Cl. .................................... 254/104; 144/34 A
[58] Field of Search ............ 254/104; 144/34 A, 34 B

[56] References Cited

U.S. PATENT DOCUMENTS

| 2,706,920 | 4/1955 | Unterhährer | 254/104 X |
| 4,030,700 | 6/1977 | Dushku | 254/104 |

Primary Examiner—Robert C. Watson
Attorney, Agent, or Firm—Sughrue, Rothwell, Mion, Zinn, Macpeak

[57] ABSTRACT

A pair of pointed, rearwardly toothed wedge members are pivotally mounted at their rear or blunt ends to spaced positions on a drive handle head, whereby they may be successively and alternatingly driven into a saw cut in a tree by pumping the handle.

8 Claims, 7 Drawing Figures

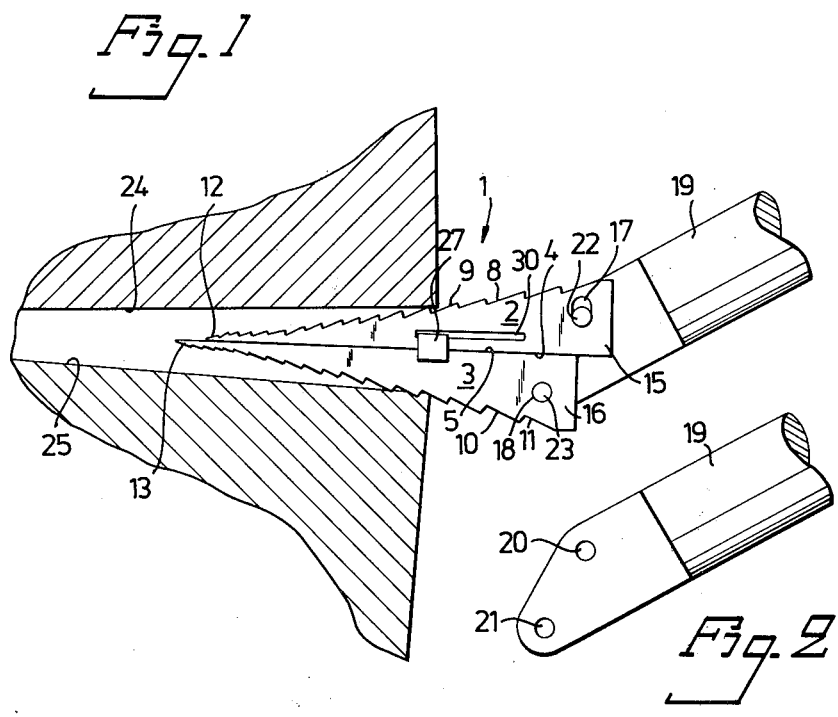
Fig.1
Fig.2
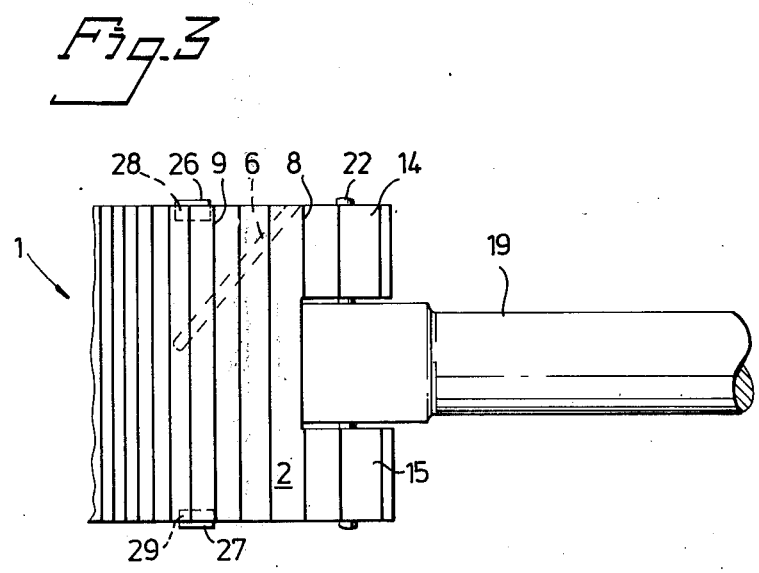
Fig.3

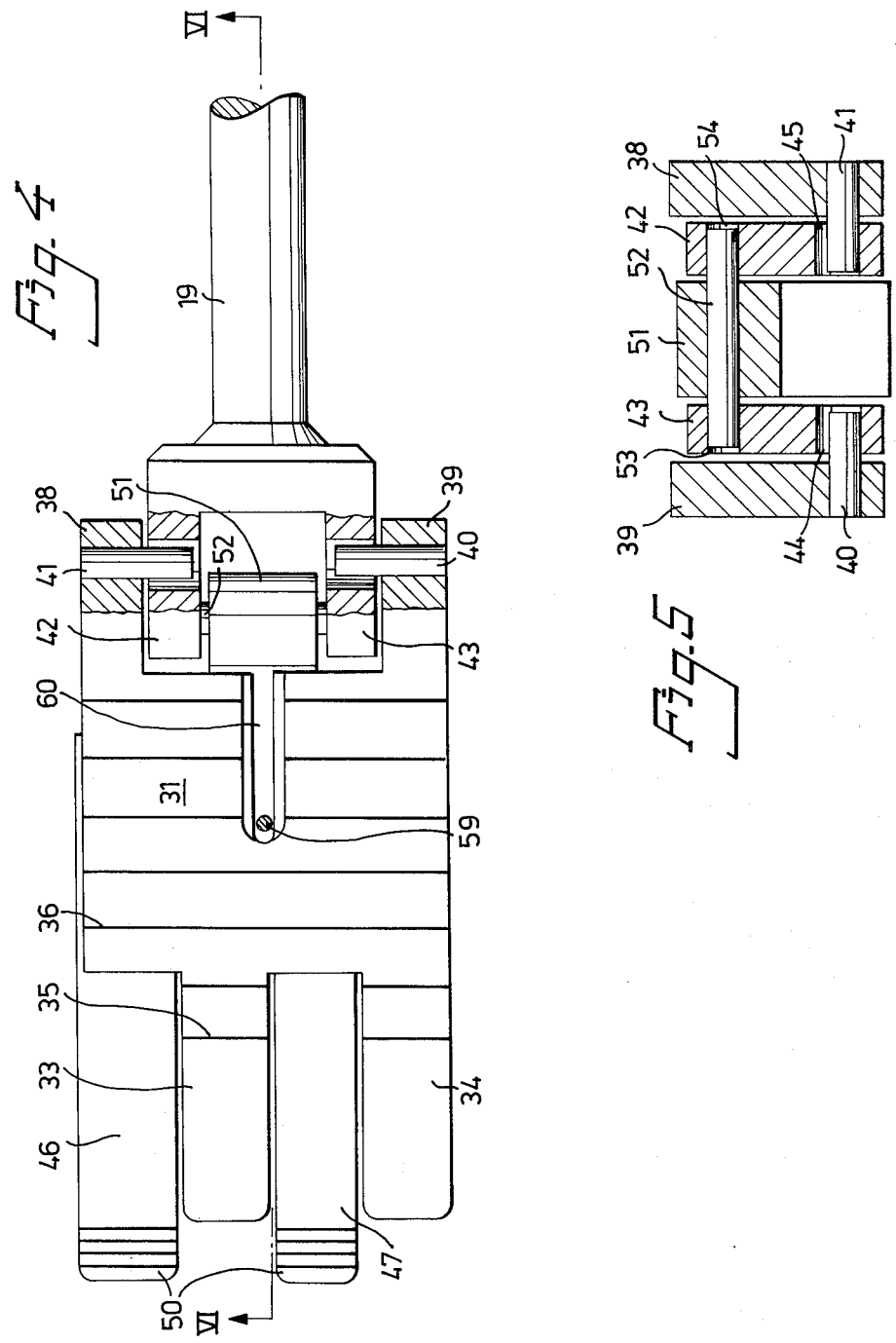

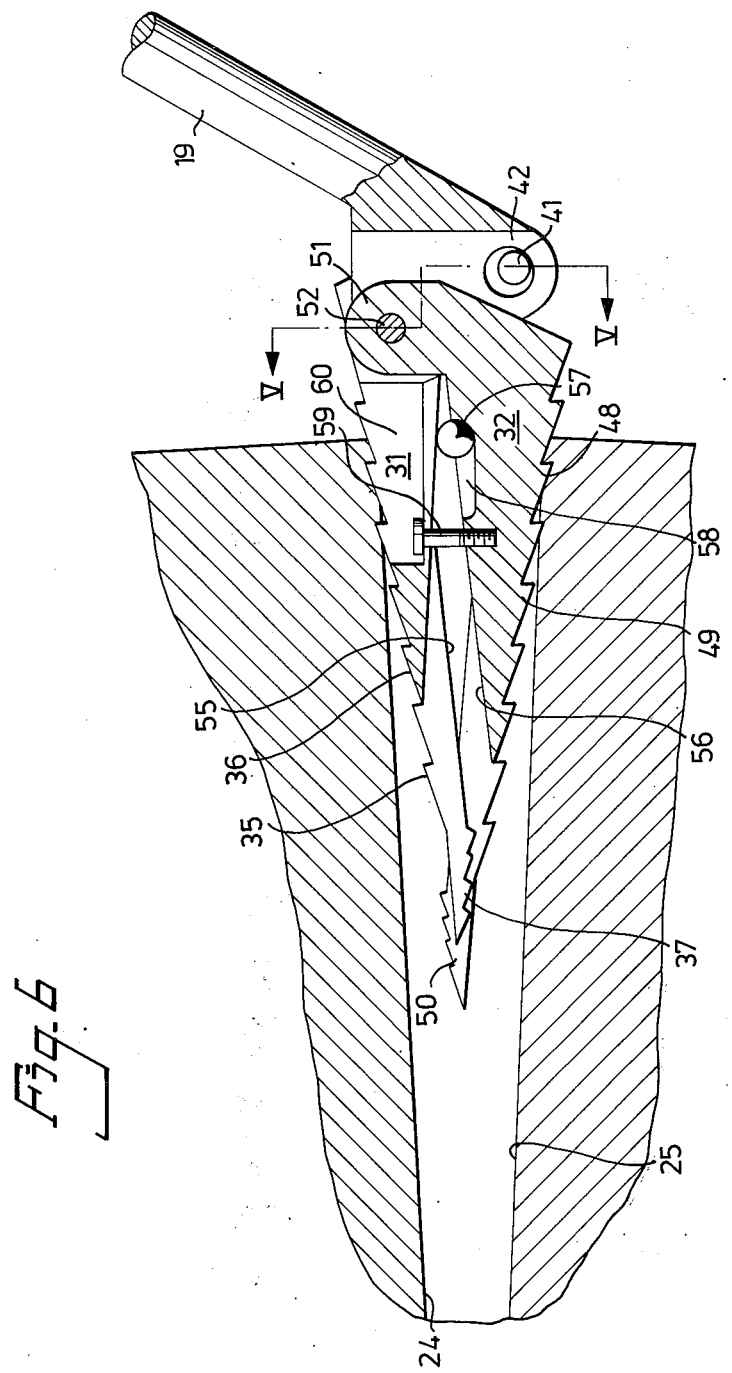

WEDGE ARRANGEMENT

BACKGROUND OF THE INVENTION

The present invention relates to a wedge arrangement.

Wedges are generally used to widen the space between two adjacent and mutually opposing surfaces, for example to fell a tree subsequent to sawing partly through the trunk thereof.

Hitherto known wedges are one piece structures which are intended to be driven into a saw cut made in the bowl of a tree for example or into the space between two adjacent, but connected surfaces by means of a sledge hammer or like driving means. Although the intended effect is obtained in the majority of cases, i.e. the space between the two surfaces is widened, with wedges having a very large wedge angle a great force is required to drive the wedge into said space, and further if the direction in which the blow is aimed does not lie directly on the wedge, there is a risk that the wedge will be knocked to one side.

SUMMARY OF THE INVENTION

An object of the invention is therefore to provide a wedge arrangement which does not require the use of a sledge hammer and which, even in the case of wide angles, can be driven into a cleft with the least possible force and which will positively maintain its correct position between those surfaces to be separated.

Briefly, and in accordance with the present invention, a pair of pointed, rearwardly toothed wedge members are pivotally mounted at their rear or blunt ends to spaced positions on a drive handle head, whereby they may be successively and alternatingly driven into a saw cut in a tree by pumping the handle.

BRIEF DESCRIPTION OF THE DRAWINGS

So that the invention will be more readily understood and further features thereof made apparent, two embodiments of the invention will now be described with reference to the accompanying schematic drawings, in which FIG. 1 is a side view of a first embodiment of the wedge arrangement arranged between two surfaces to be separated, FIG. 2 illustrates part of a lever for operating the wedge arrangement shown in FIG. 1, FIG. 3 is a plan view of part of the wedge arrangement shown in FIG. 1, FIG. 4 is a partially sectioned view of a second embodiment of a wedge arrangement according to the invention, seen in plan, FIG. 5 is a sectional view taken along the line V—V in FIG. 6, FIG. 6 is a sectional view taken along the line VI—VI in FIG. 4.

DETAILED DESCRIPTION OF THE PREFERRED EMBODIMENTS

Figure 7:
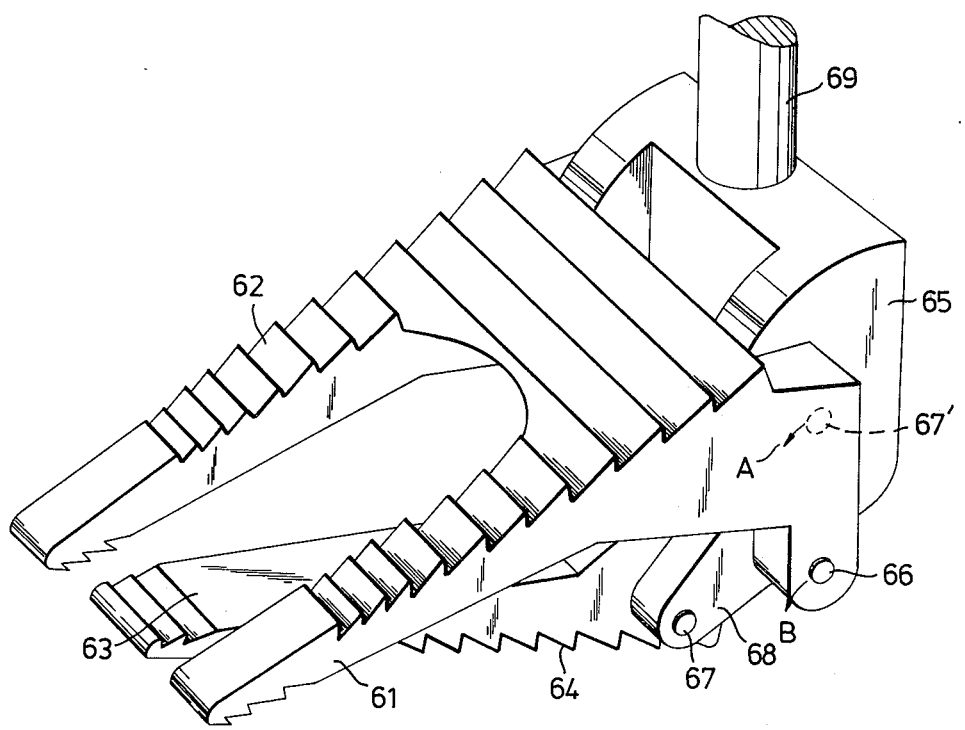
FIG. 7 illustrates a modified arrangement.

FIGS. 1-3 illustrate a first embodiment of the wedge arrangement. The wedge arrangement 1 comprises a first upper wedge member 2 and a second lower wedge member 3. The two wedge members 2 and 3 have mutually opposing abutment surfaces 4 and 5 respectively. The abutment surfaces are planar and smooth so that the two wedge member 2,3 are able to slide against each other with the least possible amount of friction and one or both of said wedge members may have arranged therein a channel which opens in the planar surface and through which grease or lubricating oil can be passed to the two mutually co-operating surfaces 4 and 5. One such channel 6 is indicated in FIG. 3 and extends from one side surface 7 of the wedge member 2. The back, working surfaces of the two wedges 2,3 are provided with rearwardly extending teeth, for example teeth 8, 9, 10 and 11 which extend across the whole of the width of each wedge member, as shown in FIG. 3. Alternatively, narrower teeth can be provided which lie in rows across the worksing surfaces of the wedge members. Arranged on the rear end portions of each said wedge member remote from the wedge points 12 and 13 respectively of said members are two lugs, as will best be seen from FIG. 3, in which Figure the lugs 14 and 15 of the wedge member 2 are shown. FIG. 1 illustrates one lug 16 of the lower wedge member 3. Extending through the lugs of respective wedge members are bearing holes 17 and 18 respectively, said holes being mutually aligned relative to one another.

A lever 19 having holes 20 and 21 is journalled between the lugs on the two wedge members by means of shafts 22 and 23. The shaft 22 extends through the holes 17 in the lugs 14 and 15 and through the hole 20 of the lever 19. The shaft 23 passes through the hole 18 of the lugs, for example 16, and through the hole 21 of the lever 19. In the embodiment of FIG. 1, the holes in the upper wedge member 2 are of oval shape so that when the wedge arrangement 1 is used the shaft 22 will not exert a separating force on the wedge members 2,3. The holes 18 may also be elongate in a direction approximately perpendicularly to the surface 4,5 or provision may be made for relative movement between the wedge member and the attachment end of the lever in a direction towards and away from the surfaces 4, 5 by elongating one or both holes in the end portion of the lever 19.

As will be seen from FIG. 1, the points 12, 13 of the wedge members are relatively thin so that the wedge arrangement can be inserted into a relatively narrow slot or the like between two surfaces 24, 25 to be separated by means of said wedge arrangement, and the size of the teeth preferably increase from the point of respective wedge members towards the end portions thereof, as illustrated in FIGS. 1 and 3.

In the illustrated embodiments, angle members 26 and 27 are fixedly arranged, for example by means of screws, to respective side surfaces of the lower wedge member 3, said angle members being intended to hold the two wedge members 2 and 3 together. Each angle member is provided with an inwardly extending flange 28 and 29 respectively (FIG. 3) which engages a cooperating groove in the side surface of the upper wedge member 2. In FIG. 1 only one groove 30 is shown.

When using the described wedge arrangement, the two wedge members 2 and 3 are inserted into the gap found between the bodies or surfaces 24, 25 to be separated from each other, with the handle 19 occupying the position shown in FIG. 1. The wedge members are inserted so that the teeth on said members positively grip the surfaces. The handle 19 is thereupon moved upwardly as viewed in the Figure, and the wedge member 3 is prevented from sliding out of engagement between the rearwardly extending teeth of the wedge member and the surface 25. Thus, the shaft 23 forms a pivot axis for the lever 19 and the shaft 22 forms a pushing member which urges the upper wedge member further into the space between the surfaces 24 and 25. As a result of the wedge angle of the wedge member 2, the surfaces 13 and 25 will be urged slightly apart. When the handle 19 is thereafter moved downwardly, the rearwardly directed teeth of the upper wedge member 2 will grip into the surface 24 and prevent the wedge member 2 from being withdrawn. Thus, in this case the shaft 22 forms a pivot axis for the lever 19 and the shaft 23 forms a pushing member which forces the lower wedge member further into the space between the surfaces 22 and 25 and expands the space therebetween. This sequence of operation is repeated until the two wedge members 2, 3 have been "pumped" sufficiently far into the slot to separate the surfaces 24 and 25 to the extent desired.

In order for the teeth to penetrate into the surface 24 and 25 to the requisite extent, the teeth must be harder than the material of said surfaces.

In certain instances the fact that the points 12, 13 do not form any form of support for the two members 2, 3 and thus do not contribute to preventing the wedge members from moving askew in the space between the surfaces 24, 25 is a disadvantage.

From this aspect the embodiment shown in FIGS. 4–6 is more suitable, since it permits the wedge members to swing away from each other. In FIGS. 4–6 the upper wedge member is referenced 31. The wedge member 31 has two wedge fingers 33 and 34 projecting from a central wedge body and, as with the previously described embodiment, the upper working surface of the wedge member 31 is provided with rearwardly extending, edge-like teeth, for example teeth 35 and 36. The end portion of the fingers 33 and 34 have an under abutment surface 37, which is preferably provided with rearwardly extending teeth. The rear end of the wedge member 31 is provided with two lugs 38 and 39 respectively, which have lower bearing holes for fixedly receiving two mutually aligned, inwardly turned bearing pins 40 and 41 respectively. In this case the lever 19 is fork-shaped having two arms 42 and 43. Each of the arms 42 and 43 has a hole 44 and 45 respectively. The peg 40 is loosely mounted in the hole 44, which has a larger diameter than the peg 40. The peg 41 is loosely mounted in the hole 45, which also has a larger diameter than the peg 41.

The lower wedge member 32 is a mirror image of the wedge member 31 and thus has a rear wedge body from which extend two wedge fingers 46 and 47. The two fingers 46 and 47 are freely pivotable in the spaces between the fingers of the upper wedge member 31. On its outwardly turned surface, the wedge member 32 is provided with rearwardly extending teeth or other gripping means comparable therewith, such as the teeth 48 and 49 and the inner surface of the point portion of said wedge member forms an abutment surface 50 which is preferably provided with rearwardly extending teeth.

The outer end portion of the wedge member 32 has a central lug 51 having a through passing peg 52 projecting outwardly on both sides of said lug. The two free ends of the peg 52 are freely mounted in upper holes 53 and 54 in respective arms 42, 43 of the fork lever 19.

The central bodies of the two wedge members 31, 32 have planar mutually conforming surfaces 55 and 56 respectively, which enable the wedge members to be placed together so that the surface 50 lies against the surface 24 and the surface 37 lies against the surface 25 to form a guide into the space for the wedge arrangement. To maintain the two wedge members in a normal position with the points on the wedge fingers lying in a common plane, there may be provided a resilient element, for example a rubber ball 57, in a groove 58 in the lower wedge member 32. This rubber ball presses against the under surface of the wedge member 31. For the purpose of guiding the wedge members 31 and 32 relative to one another there is provided a bolt 59 which is screwed into the lower wedge member 32 and the head of which is slidable arranged in a groove 60 in the upper wedge member 31.

When the lever 19 of the embodiment according to FIGS. 4, 5 and 6 is moved downwardly subsequent to bringing the wedge members firmly between the surfaces 24 and 25, the lower wedge member 32 will be firmly locked by its rearwardly extending teeth and the shaft 52 will form a fixed pivot point for the forked arms 42, 43 of said lever. As the lever 19 is moved downwardly, the pegs 40 and 41 will urge the upper wedge member 31 forwardly and at the same time swing the pointed surface 37 of said wedge member into abutment with the surface 25. When the lever is subsequently moved upwards, the upper wedge member 31 will be prevented from sliding upwardly and the pegs 40, 41 form a fixed axis of rotation. The shaft 52 thus forms a means for inserting the lower wedge member 32 further into the gap, this wedge member being swung upwardly during its inward movement until the abutment surface 50 engages the surface 24. This sequence of operation is repeated until the wedge arrangement has been "pumped" far enough in between the surfaces 24 and 25 for the surfaces to be separated to the intended amount.

As will be readily understood, the manually operated handle by means of which the aforedescribed alternate insertion movement of the two wedge members is achieved, can be replaced by a drive means, comprising two hydraulic or pneumatic pistons which will move the wedge members alternately into the space between the surfaces to be separated, or by pistons that are operated with other means than air or hydraulic fluid.

The aforedescribed wedge arrangement is operated by means of a head. When the head is pivoted by means of, for example, a lever, the wedge members are only lifted a small distance apart. In many cases, it has been found that the wedge members must be lifted further apart in order for, for example, a tree to be felled satisfactorily.

FIG. 7 illustrates a modified embodiment of the wedge arrangement in which the connection between the head and the two wedge members is such that in addition to permitting the wedge members to be driven in to a cleft between two surfaces to be separated enables the separation of said surfaces to be effected by means of the head, whereupon a tree can be felled more readily.

The modified embodiment shown in FIG. 7 comprises an upper wedge member 61 which comprises two parts and which is provided with teeth 62 arranged to grip one of the two surfaces to be separated, and a lower wedge member 63 having teeth 64 engaged to grip the other surface to be separated. The two surfaces to be separated from each other are not shown but, as will be understood, may be the opposing surfaces of a sawcut made in the trunk of a tree. The wedge member 61 is pivotally mounted on a head 65 by means of a shaft 66, and the wedge member 63 is pivotally mounted on a shaft 67 which extends through two lugs on the head 65, of which lugs only one, 68, is shown. The head 65 is provided with a lever 69.

The wedge members 61 and 63 are shown in a lifted position, i.e. the end portions of respective wedge members have been lifted away from each other. The rear portions of the wedge members can be further parted by further rotating the head 65 anticlockwise until its shafts 66 and 67 lie on one line with each other, this line being substantially vertical. In this latter case, the lever 69 is brought to a position in which it is inclined more anticlockwise that its illustrated position in the figure. The angle which is generated by rotating the head 65 to the illustrated position is, however, sufficient to fell a tree into which the wedge arrangement has been driven. Whilst the wedge members are being driven alternately into said cleft by pumping the lever 69, the lever lies obliquely downwardly, the shaft 67 being located approximately in the position shown at 67'. Whilst pumping the handle, the shaft 67 is moved from the position 67' alternatively with the shaft 66 in the direction of arrows A and B respectively.

As soon as the wedge members have been driven in to the intended depth in the sawcut and are well locked therein, the handle 69 is swung counterclockwise to the position shown in the figure, whereupon the wedge members 61 and 63, which were in close abutment with each other whilst being driven in the said cleft are moved to the position shown in the figure, i.e. the wedge angle is greatly increased to exert an additional wedge force causing the tree to fall.

It is essential that the pivot connections 66, 67 are so arranged on the head 65 that said head can adopt a first position with the wedge members close to each other to enable them to be driven into said cleft, and a second position in which the wedge members are moved apart to greatly increase the wedge angle.

The fork-like wedge member 61 may be divided into two separate wedge sections on either side of the central wedge member 63 and each such separate wedge sextion is journalled on a lug 68 by means of a shaft 66. It is also possible to change the bearing points so that the central wedge member 63 is journalled in the head 65 on the shaft 66 and the further wedge members or member, for example the wedge section 61, is journalled on the shaft 67.

I claim:

1. A wedge arrangement for forceably spreading apart the opposing surfaces of a saw cut made in a tree, comprising:
   (a) a first pointed wedge member having at least two spaced, parallel fingers,
   (b) a second pointed wedge member having at least one finger disposed in the space between said two fingers of the first wedge member, the second wedge member having substantially the same length as the first wedge member,
   (c) wood gripping means on the outer surfaces of each wedge member directed rearwardly from the respective points thereof for engaging the opposing surfaces of a saw cut in a tree, and
   (d) drive means coupled to the first and second wedge members for alternately applying an axial force to each of said members to successively advance the wedge arrangement into the saw cut in a step-by-step manner.

2. A wedge arrangement according to claim 1, further comprising guide means operative to guide the wedge members relative to one another in their axial direction arranged between said wedge members.

3. A wedge arrangement according to claim 2, wherein the mutually facing surfaces of the respective wedge members are so formed that the wedge members can be swung to a position in which said fingers cross each other.

4. A wedge arrangement according to claim 1, wherein the mutually opposing surfaces of said wedge members are slide surfaces.

5. A wedge arrangement according to claim 1, wherein the drive means comprises a lever having a head which is pivotally connected to the respective wedge members.

6. A wedge arrangement according to claim 3, further comprising a resilient means arranged between the two wedge members such that the wedge points of said wedge members in their unloaded state substantially in line with each other.

7. A wedge arrangement according to claim 3, wherein rearwardly extending gripping means are provided on the inner surface of each wedge member adjacent the points thereof.

8. A wedge arrangement according to claim 5, wherein the head is arranged to be rotated between a first position, in which the two wedge members lie closest together and a second position in which the end portions of the wedge members mounted on said head are moved away from each other.

* * * * *